United States Patent [19]
Almasi et al.

[11] 3,781,832
[45] Dec. 25, 1973

[54] MAGNETORESISTIVE SENSING OF MAGNETIC BUBBLE DOMAINS USING EXPANSION

[75] Inventors: George S. Almasi, Katonah; Robert J. Hendel, Peekskill; George E. Keefe, Montrose, all of N.Y.

[73] Assignee: International Business Machines Corporation, Armonk, N.Y.

[22] Filed: Dec. 20, 1971

[21] Appl. No.: 209,914

[52] U.S. Cl. ...................... 340/174 EB, 340/174 TF
[51] Int. Cl. ........................ G11c 11/14, G11c 19/00
[58] Field of Search ................. 340/174 EB, 174 TF

[56] References Cited

UNITED STATES PATENTS

| | | | |
|---|---|---|---|
| 3,702,995 | 11/1972 | Bobeck et al. | 340/174 TF |
| 3,689,901 | 9/1972 | Bobeck | 340/174 TF |
| 3,609,720 | 9/1971 | Strauss | 340/174 TF |

OTHER PUBLICATIONS

Scientific American, "Magnetic Bubbles" by Bobeck et al., June 1971, pp. 78–90.

*Primary Examiner*—Stanley M. Urynowicz, Jr.
*Attorney*—Jackson E. Stanland

[57] ABSTRACT

An improved magnetoresistive sensing device for detection of cylindrical magnetic domains (bubble domains) in which the domains are expanded before being sensed. The sensing element is magnetically soft material, such as permalloy, located in flux-coupling proximity to bubble domains which exist in a magnetic sheet. Current through the sensing element aids in the bubble domain expansion and does not impede bubble domain motion even though it is of large magnitude. Due to the expansion, a greater output signal is achieved. The structure also is useful in providing bubble domain annihilation after sensing. This eliminates the usual time delay in moving the domain to an annihilator circuit for destruction and also eliminates the need for a separate annihilator circuit.

9 Claims, 12 Drawing Figures

MAGNETORESISTIVE SENSING OF MAGNETIC BUBBLE DOMAINS USING EXPANSION

BACKGROUND OF THE INVENTION

1. FIELD OF THE INVENTION

This invention relates to magnetoresistive sensing of bubble domains, and more particularly to an improved magnetoresistive sensing device in which domains are expanded before being sensed in an integrated structure providing both expansion and sensing of domains.

2. DESCRIPTION OF THE PRIOR ART

Magnetoresistive sensing of cylindrical magnetic domains (bubble domains) is known, as can be seen by referring to copending patent applications Ser. No. 78,531, filed Oct. 6, 1970, now U.S. Pat. No. 3,691,540 in the name of G. S. Almasi et al. and Ser. No. 89,964, filed Nov. 16, 1970, in the name of G. S. Almasi et al., both of which are assigned to the present assignee. In those applications, a magnetoresistive sensing element is located in flux coupling proximity to magnetic bubble domains which are propagated in an underlying magnetic sheet, such as garnet or orthoferrite. When the stray magnetic field of a bubble domain intercepts the sensing element, the magnetization vector of the sensing element is rotated and the resistance of the sensing element changes. If current is flowing through the sensing element, the resistance change can be detected as either a voltage or a current change, as is explained in the aforementioned copending applications.

Magnetoresistive sensing of bubble domains is very useful in memory systems, such as that described in copending application, Ser. No. 103,046, filed Dec. 31, 1970 now U.S. Pat. No. 3,701,125 in the name of H. Chang et al. In that memory system, information is stored in a number of closed loop shift registers in which magnetic bubble domains circulate. Each information channel has a two-for-one bubble domain splitter; one bubble from the splitter continues to be stored while the other propagates to a magnetoresistive sensor. After being sensed, the bubble domain goes to a bubble buster and is destroyed.

In a memory system, such as that described in aforementioned copending application, Ser. No. 103,046, it is desirable to eliminate the space required for a separate domain busting circuit. It is also desirable to eliminate the time required for a domain to be propagated from the region of the magnetoresistive sensor to a separate busting circuit for destruction.

Another feature of magnetoresistive sensing which must be considered is the amount of measuring current traveling through the magnetoresistive sensing element. The signal amplitude from the sensing element is proportional to the measuring current. This current is generally limited in magnitude since the magnetic field established by this current will affect bubble domain motion. Because the magnitude of the measuring current is limited for this reason (being on the order of milliamps in most cases), the amount of signal developed when sensing a bubble domain is less than that which could be achieved if higher currents were used.

Accordingly, it is a primary object of this invention to provide an improved magnetoresistive sensing device for detection of magnetic bubble domains which provides greater output signals than heretofore realized.

It is another object of this invention to provide a magnetoresistive sensing device for detection of magnetic bubble domains which operates with higher measuring current than previous magnetoresistive sensing devices.

It is still another object of this invention to provide a magnetoresistive sensing device for detection of bubble domains in which the current flow through the sensing device does not adversely affect bubble domain motion.

It is a further object of this invention to provide a magnetoresistive sensing device for detection of magnetic bubble domains which is a totally integrated structure providing both sensing of magnetic domains and destruction of the domains after sensing.

It is a still further object of this invention to provide a magnetoresistive sensing device for detection of bubble domains which provides both sensing of domains and destruction of domains in a structure which is easily fabricated and does not require additional inputs beyond that normally required to sense magnetic bubble domains.

It is another object of this invention to provide a magnetoresistive sensing device for detection of magnetic bubble domains which aids in collapsing a bubble domain after detection of that domain.

It s still another object of this invention to provide a magnetoresistive sensing device for detection of magnetic bubble domains which reliably destroys the domains after sensing.

SUMMARY OF THE INVENTION

This improved magnetoresistive sensing device can be used in conjunction with any type of magnetic bubble domain propagation means, such as T and I bars, chevron shaped elements, and conductor propagation means. The structure is a completely integrated structure which provides bubble domain expansion, detection, and destruction. It is easily fabricated using conventional techniques and requires a minimum amount of space on the magnetic sheet in which the domains propagate. Since domain destruction is performed by the same apparatus, it is not necessary to provide a separate destructor circuit and the speed of operation increases, because it is not required to move the domains to a separate circuit for destruction, after they are sensed.

The sensing device comprises a magnetoresistive sensing element which is located in flux-coupling proximity to domains which can be propagated in an adjacent magnetic sheet, such as a garnet or orthoferrite sheet. The magnetoresistive sensing element is comprised of any material which exhibits a magnetoresistive effect. A particularly useful example is permalloy. The sensing element is electrically connected to means for providing a measuring current through the sensing element. This means can be either a constant current source or a constant voltage source. If a constant current source is provided, the voltage change developed across the magnetoresistive sensing element due to a change in resistance of the element is detected. If a constant voltage source is used, the current change occurring when the resistance of the element changes is detected. Consequently, the change in resistance of the sensing element when magnetic fields intercept the element is easily detected electrically to indicate the presence and absence of magnetic bubble domains.

Located adjacent the magnetoresistive sensing element is an expansion means which expands the magnetic bubble domains before they are sensed by the sensing element. The expansion means comprises a soft magnetic material which is shaped so as to provide a plurality of spaced magnetic poles which are attractive to bubble domains. These magnetic poles are created by a rotating, in-plane magnetic field. Since the attractive poles are spaced apart, a magnetic domain will be expanded and the magnetic flux intercepting the magnetoresistive sensing element is correspondingly greater. This provides a larger output signal.

In addition to the expansion due to the attractive poles of the expansion means, the measuring current through the sensing element also aids bubble domain expansion. The measuring current produces a magnetic field which in this case does not impede bubble domain motion. Therefore, the measuring current can be increased to a value which is much higher than that used in previous magnetoresistive sensing elements. In fact, the magnitude of the measuring current is determined only by the heat dissipation properties of the magnetoresistive sensing element.

The expansion means can also be used to provide bubble domain collapse after the domain is detected. In this case, the poles which were previously attractive change to repelling magnetic poles when the in-plane magnetic field rotates, thereby causing a collapse of the expanded domains. If the direction of the measuring current through the sensing element is reversed, the magnetic field established by the measuring current will also aid the collapse operation. Therefore, means are provided to change the direction of current through the magnetoresistive sensing element.

It is generally most efficient to have the length of the magnetoresistive sensing element be approximately the diameter of bubble domains to be sensed, in order that the magnetization vector of the entire sensing element be rotated in the presence of a bubble domain field. Because the domains are expanded before being sensed, the sensing element length can be up to approximately 10 times the unexpanded bubble domain diameter in this embodiment. In addition, a measuring current amplitude five times greater than usual can be used.

In another embodiment, a magnetoresistive sensing device having an expansion means is provided in proximity to a conductor propagation means for moving bubble domains to the sensing device. In this case, the expansion means is a current loop having permalloy associated therewith which expands the domain while it is located in a position outside this expansion loop.

These and other objects, features, and advantages will be more clearly apparent from the following more particular description.

BRIEF DESCRIPTION OF THE DRAWINGS

FIG. 5A is a plot of the propagation field components versus time while FIG. 5B is a plot of the measuring current as a function of time.

FIG. 5C is a plot of the clock pulse train used to control operation of the sensing device of FIG. 1.

DETAILED DESCRIPTION OF THE PREFERRED EMBODIMENTS

Figure 1:
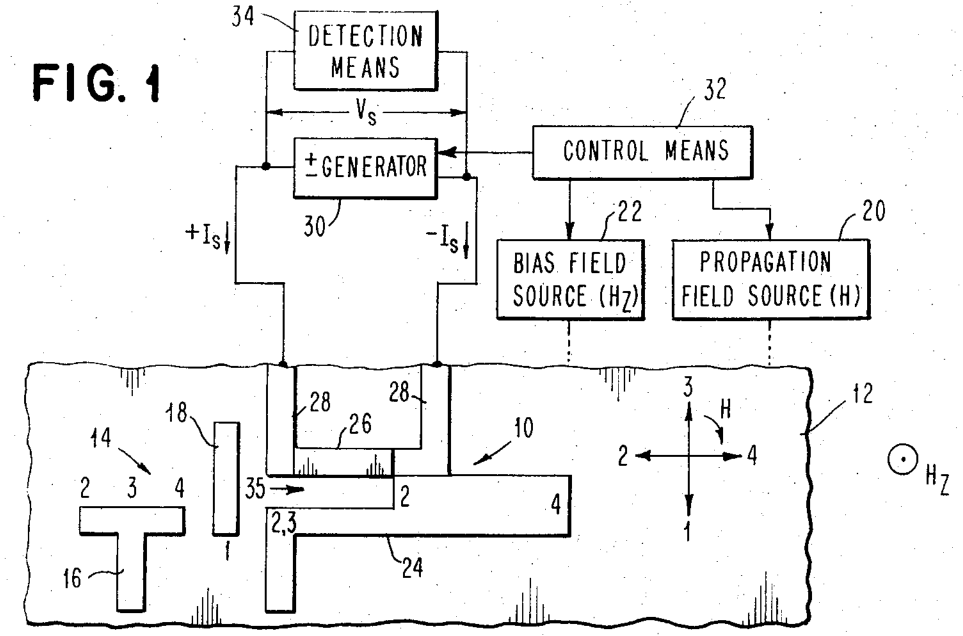
FIG. 1 shows an improved magnetoresistive sensing device having means for expanding the domains and for destroying the domains after detection.

FIG. 1 shows an integrated magnetoresistive sensing device, bubble domain expander, and domain buster, generally indicated by reference numeral 10. Device 10 is located on magnetic sheet 12 or on a thin spacer layer deposited over magnetic sheet 12. Bubble domains travel to device 10 following a path dictated by the propagation means 14, shown here as T and I bars 16 and 18. Propagation of domains along the propagation means 14 is achieved by providing a reorienting, in-plane magnetic field H which rotates in the various directions 1–4 as indicated. Propagation field H is provided by a propagation field source 20 which could be, for instance, X and Y magnetic coils located around magnetic sheet 12. A magnetic bias field $H_z$ is provided in a direction substantially normal to magnetic sheet 12. Field $H_z$ is produced by bias field source 22 and is used to stabilize domains in magnetic sheet 12. In FIG. 1, $H_z$ is directed upward out of the plane of the paper, as indicated. Hence, the magnetization inside the bubble domains will be pointing downward into the paper. This means that positive poles in propagation means 14 will attract bubbles, and negative poles will repel bubbles.

The integrated sensing, expanding, and busting device 10 comprises a first portion 24 which magnetically holds bubble domains while they are being sensed and which also aids in expansion of these domains prior to sensing. Portion 24 provides the domain busting function after sensing is performed. In general, portion 24 is made of the same soft magnetic material used for T bar 16 and I bar 18. Permalloy is a suitable example.

The sensing portion of integrated device 10 comprises a magnetoresistive sensing element 26 and electrical conductors 28. Magnetoresistive sensing element 26 is comprised of any material exhibiting a magnetoresistive effect, an example of which is permalloy. The conductors 28 can be any suitable conductors such as copper or gold. Conductors 28 and magnetoresistive sensing element 26 are deposited directly onto magnetic sheet 12 or onto a thin sheet of non-magnetic material (such as $SiO_2$) which has been previously deposited on magnetic sheet 12 to provide the proper spacing between magnetic sheet 12 and propagation means 14.

Current flow through sensing element 26 is provided by ± generator 30. This generator produces currents $+I_s$ and $-I_s$, depending on the input pulse train from control means 32, which also controls the onset of the bias field $H_z$ and the propagation magnetic field H. Detection means 34 detects the resistance changes of element 26, and could be a voltmeter, an oscilloscope, or a sense amplifier responsive to the voltage signal $V_s$ developed across element 26 when a domain is sensed.

In FIG. 1, the numbers and various pole positions on the propagation means 14 and the portion 24 of device 10 correspond to the pole positions created by the rotating, in-plane magnetic field H. As will be more fully apparent when FIGS. 3A–3E are discussed, bubble domains will be brought to device 10 by propagation means 14 and will be expanded in the region 35 between sensing element 26 and portion 24. After this, the domains will be collapsed.

The structure of FIG. 1 is provided by conventional techniques known in the art. For instance, magnetic sheet 12, which can be a garnet or orthoferrite, is first coated with a layer of $SiO_2$ by standard evaporation or sputtering techniques. After this, magnetoresistive sensing element 26 is deposited by standard evaporation or sputtering techniques. Sensing element 26 is generally about 200 angstroms thick. Subsequently, the propagation means 14 and portion 24 are deposited to a greater thickness (about 3,000 angstroms). Conductors 28 are then provided for electrical contact to element 26.

Figure 2:
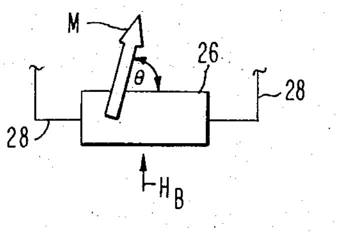
FIG. 2 shows the operation of a magnetoresistive sensing device for detection of stray magnetic fields from magnetic bubble domains.

FIG. 2 illustrates the operation of sensing element 26 when a magnetic field is coupled to it. When no magnetic field is present across element 26, its magnetization vector M will lie along the direction of current flow through element 26 (which concidentally is the easy axis direction). When the magnetic field $H_B$ of a bubble domain intercepts element 26, vector M is rotated through an angle $\theta$. This produces a resistance change in element 26 which is detected by detection means 34 as a current or voltage change. For instance, if a constant current passes through element 26, a voltage change $V_s$ will be detected when the resistance of element 26 changes. On the other hand, if a constant voltage is applied across element 26, a current change will be detected when the resistance of element 26 changes as a magnetic field intercepts it.

FIGS. 3A–3E describe the operation of the integrated device of FIG. 1. Although this device includes the function of domain collapse after sensing, it should be understood that this function could be provided by a means separate from portion 24 of device 10.

The operation is illustrated in FIGS. 3A–3E for various orientations of magnetic propagation field H. The particular components of magnetic field H and the measuring current pulses $I_s$ are shown more clearly in FIG. 5, which also shows the frequency of the clock pulses from the control means 32.

Figure 3A:
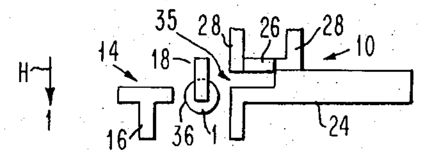
FIGS. 3A–3E show the operation of the sensing device of FIG. 1 for various orientations of the magnetic propagation field H.
Figure 3B:
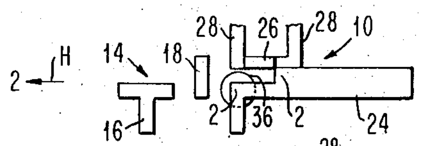
Figure 3C:
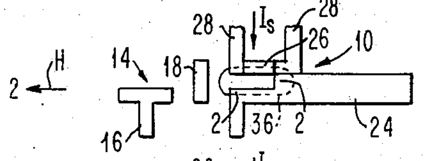

In FIG. 3A, a magnetic bubble domain 36 is located at pole position 1 of I bar 18 when propagation field H is in direction 1. As field H rotates clockwise to direction 2, domain 36 moves to pole position 2 on portion 24 of device 10. At this time no current $I_s$ flows through sensing element 26 (FIG. 3B). In FIG. 3C, the magnetic field H is still in direction 2 but a positive current $+I_s$ flows through sensing element 26. The flow of current $+I_s$ creates a localized magnetic field which opposes the bias field $H_z$ in the region 35 between sensing element 26 and portion 24. Consequently, domain 36 expands to the contour shown by the dashed line beneath portion 24 and element 26. Expansion of the domain is also aided by the two magnetic poles (positions 2) located on portion 24. These pole positions are attractive for the domain 36 and aid in expansion of the domain.

Figure 3D:
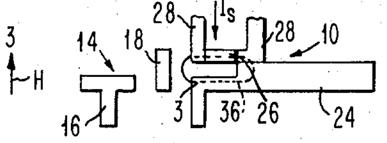

In FIG. 3D, propagation field H has changed to direction 3, and current $+I_s$ flows through sensing element 26. Domain 36 is sensed while propagation field H is in directions 2 and 3 while and the current $+I_s$ flows through element 26. Because domain 36 has been expanded considerably, the total magnetic flux linking element 26 is increased and a larger output signal $V_s$ is obtained. Domain 36 can be expanded up to approximately ten times its original diameter to provide large signals. Since the current flow $+I_s$ does not adversely influence domain motion, the magnitude of this current can be increased to the limit of heat dissipation in element 26. This provides an even greater output signal.

The region 35 between sensing element 26 and portion 24 is generally about the width of a T or I bar element.

Figure 3E:
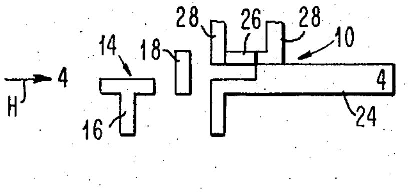

In FIG. 3E, the magnetic field H moves to direction 4. This creates negative magnetic poles at the ends of region 35 which cause a collapse of domain 36. The positive, attracting pole formed at the extreme right-hand end of element 24 is too far away to allow the domain to travel there. If desired, a current $-I_s$ is provided through element 26 to create a magnetic field in region 35 which aids the bias field in this region and helps to collapse the domain. In this case, a clock pulse from control means 32 triggers generator 30 to produce the current $-I_s$ which is oppositely directed to the current $+I_s$ used for sensing.

Figure 4:
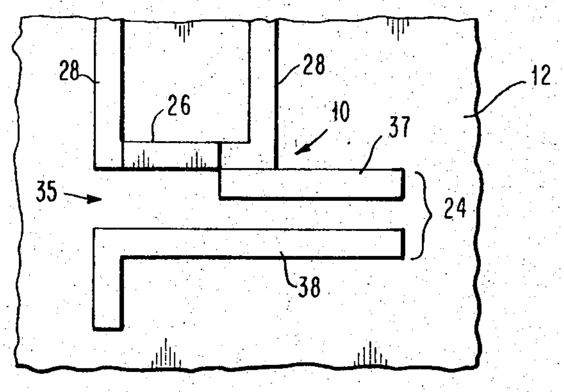
FIG. 4 shows an alternate expansion means which can be used in a magnetoresistive sensing device similar to that shown in FIG. 1.

FIG. 4 shows an alternate structure for the integrated device 10 illustrated in FIG. 1. The same reference numerals are maintained, wherever possible. In FIG. 4, portion 24 is comprised of separate elements 37 and 38. The sensing portion of device 10 is the same as that shown in FIG. 1 and comprises sensing element 26 and conductors 28. In order to make the drawing more simplified, the associated generators, control means, magnetic sheet, etc., are not shown.

The operation of device 10 in FIG. 4 is the same as that for the device of FIG. 1. Domains 36 are brought into recess 35 and are expanded before sensing. After this the domains are destroyed by the formation of negative poles at both ends of recess 35 when magnetic field H is in direction 4. In the structure of FIG. 4, the negative magnetic pole produced at the right-hand end of recess 35 (the negative pole produced at the left-hand portion of bar 37) is greater than the negative pole produced in the corresponding position of portion 24, shown in FIG. 1. This aids in annihilation of domain 36 after sensing. The positive, attracting poles at the right-hand ends of bars 37 and 38 are again too far away to allow the domain to travel there.

Figures 5A, 5B, 5C:
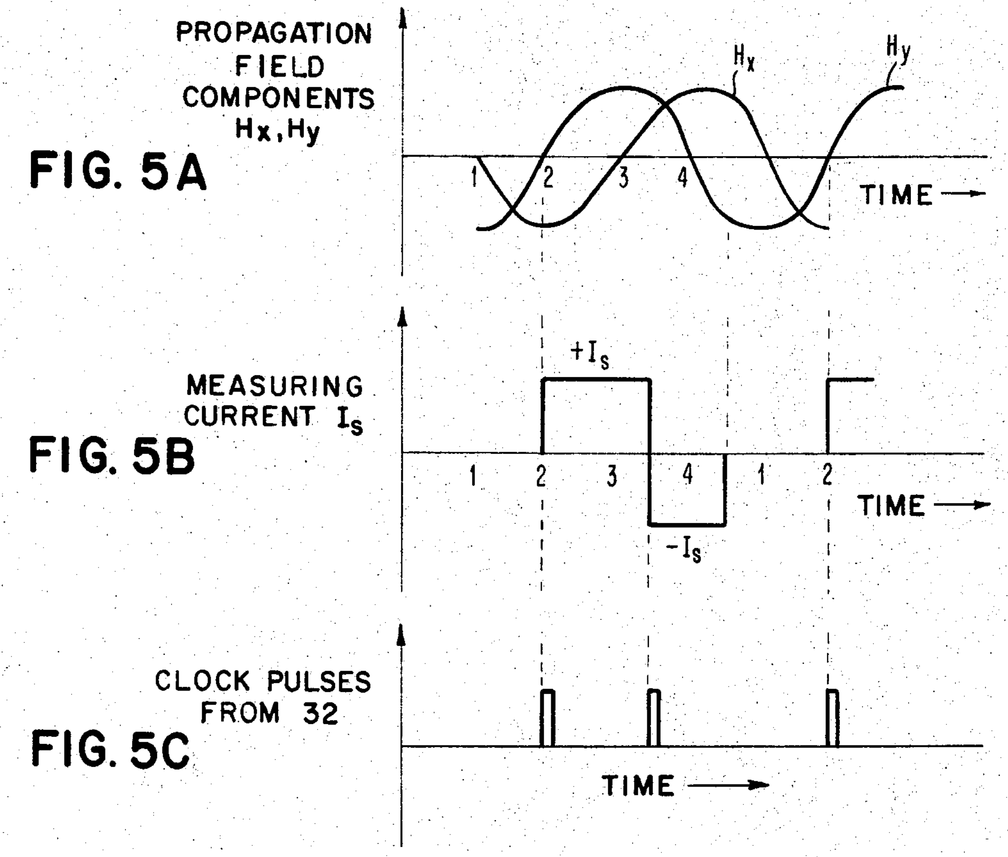

FIG. 5 shows the various drive pulses and measuring currents used during operation of the device shown in FIG. 1. The components $H_x$ and $H_y$ of the propagation magnetic field H are plotted as a function of time, as is the measuring current $I_s$ and the clock pulses from control means 32. The numbers 1 2 3 4, 1 along the abscissa correspond to the directions of the magnetic field H. For instance, magnetic field H is directed to the left (along the horizontal direction) when H is in position 2. Therefore, the component $H_x$ has a maximum negative value while the component $H_y$ has a zero value at this time.

The measuring current $I_s$ has a positive value (+) during the sensing operation, which occurs during the time the propagation field H is located in directions 2 and 3. Actually, the current $I_s$ can appear for a somewhat longer or shorter time as is evident from FIG. 5. When the propagation field H moves to direction 4, domain 36 is annihilated. As was explained previously, a current $-I_s$ directed through sensing element 26 at this time will create a magnetic field aiding the bias field to enhance the annihilation operation. After this, current $I_s$ does not reappear until propagation field H is in direction 2.

The clock pulses from control means 32 trigger current generator 30 to produce $\pm I_s$. These control pulses are short pulses used to provide the appropriate current $I_s$ through sensing element 26.

Figure 6:
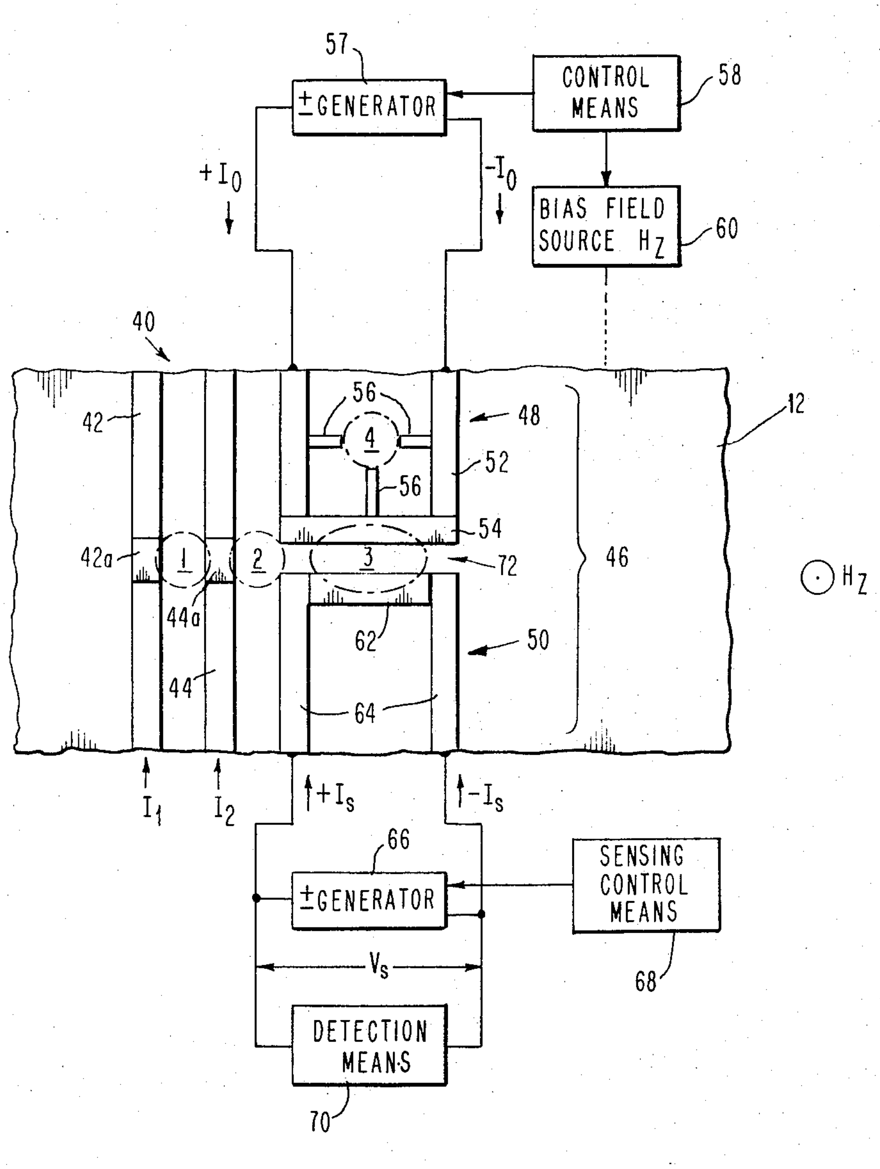
FIG. 6 is an alternate embodiment of the magnetoresistive sensing device together with conductor propagation means.

FIG. 6 shows an alternative embodiment for an improved sensor, expander, and domain buster which is adapted for use with conductor propagation means. In this embodiment, a conductor propagation means 40 comprises substantially parallel conductors, such as 42 and 44 which have small deposits 42*a* and 44*a* thereon. These deposits are of suitable magnetic material such as permalloy. They serve to guide the domains as they move from one side of a conductor to another in response to currents $I_1$ and $I_2$ sequentially directed through alternate conductors. Device 46 is comprised of an expanding/busting portion 48 and a sensing portion 50.

Expansion/annihilation portion 48 comprises a current conducting loop 52 which has a deposit 54 of soft magnetic material (such as permalloy) thereon. In the center of loop 52 are permalloy bars 56 which hold a domain while it is being annihilated. Connected to loop 52 is a current generator 57 which provides oppositely directed currents $+I_0$ and $-I_0$ through loop 52. Control of generator 57 is provided by control means 58. This control means also regulates the bias field source 60 which produces magnetic bias field $H_z$.

Sensing portion 50 comprises magnetoresistive sensing element 62 and conductors 64 which carry measuring currents $\pm I_s$ to element 62. Currents $\pm I_s$ are produced by $\pm$ current generator 66, which is controlled by sensing control means 68. Detection means 70 is connected across element 62 to measure the voltage signals $V_s$ which develop when magnetic domains are sensed.

In operation, domains are moved to the right by sequential current pulses $I_1$ and $I_2$ through conductors 42 and 44, respectively. The positions of domains during the entire cycle of operation is indicated by dashed circles labelled 1, 2, 3(ellipse), and 4. As is apparent, current $I_2$ through conductor 44 moves a domain to position 2. At this time, a current $+I_0$ through conductor loop 52 moves the domain to the region 72 between portions 48 and 50. The magnetic field produced by current $+I_0$ produces a magnetic field in region 72 which opposes the bias field $H_z$ in this region. This aids the action of permalloy strip 54 in expanding the domain as indicated by elliptical domain position 3. At this time current $+I_s$ flows through sensing element 62 and the domain is sensed, thereby producing voltage signal $V_s$.

After sensing, control means 58 triggers generator 57 to produce current $-I_0$ through loop 52. This creates a decreased bias field in the center of loop 52 and the domain moves to position 4 where it is held by permalloy pieces 56. Control means 58 now triggers generator 57 to produce current $+I_0$. This creates a local increase in bias field in the center of loop 52. Permalloy bars 56 prevent the domain from escaping, hence the domain is collapsed.

EXAMPLE

As an example, an epitaxial garnet film with composition $Eu_{0.7}Y_{2.3}Fe_{3.8}Ga_{1.2}O_{12}$ with a thickness of 15$\mu$m, bubble diameter $\approx$ 12$\mu$m, and $4\pi M_s$=125 gauss requires $\approx$ 75 Oe bias field and 30 Oe in-plane drive field. The conductor line width is about 8$\mu$m, so the effective vertical field produced in its vicinity is on the order of 0.8 Oe/mA. A 10 mA current thus produces an appreciable local change in the z-bias field and is the approximate value used to operate the device in this case. By comparison, the current in an ordinary sensor in the same environment must be <2mA to avoid undesirable interactions with bubble propagation.

What has been described is an improved magnetoresistive sensing device which provides integrated structures to achieve expansion and domain destruction after sensing. Greater signal outputs are produced and the structure is compatible with various propagation means. Whereas permalloy is a particularly suitable material for the means to sense the domain and to expand and annihilate the domain, other soft magnetic materials are suitable. Also, the particular shape of the portion used to expand and destroy the domains can be varied from that shown. The structure provides efficient expansion and destruction of domains by providing a plurality of attractive and repulsive poles for expansion and destruction, respectively.

What is claimed is:

1. A magnetoresistive sensing device for detecting magnetic domains in a magnetic medium, comprising:
   - a magnetoresistive element whose resistance changes when it is intercepted by the stray magnetic field associated with said magnetic domain,
   - an electrical source providing electrical current through said magnetoresistive element when said domain is to be sensed,
   - an expansion means integrated with said magnetoresistive element for expanding said domain prior to sensing by said magnetoresistive element, said magnetoresistive element being positioned with respect to said domain and said expansion means such that said electrical current through said magnetoresistive sensing element creates a magnetic field which aids the expansion of said domain,
   - detection means responsive to said resistance change for indicating the presence and absence of said domain in flux-coupling proximity to said magnetoresistive element,
   - wherein said expansion means is comprised of magnetically soft elements which provide attractive magnetic poles for expansion of said domain in response to a reorienting magnetic field in the plane of said magnetic medium, and further including field means for producing said reorienting magnetic field,
   - collapse means integral with said expansion means for collapsing said domain after being sensed by said magnetoresistive element.

2. The device of claim 1, including means for reversing the polarity of said electrical current.

3. The device of claim 1, where said collapse means is comprised of a magnetically soft element which creates magnetic poles for collapse of said domain in response to the orientation of said reorienting magnetic field.

4. The device of claim 3, where said expansion means and said collapse means are comprised of a common element of magnetically soft material.

5. A magnetoresistive sensing device for detecting magnetic domains in a magnetic medium, comprising:

a magnetoresistive element whose resistance changes when it is intercepted by the stray magnetic field associated with said magnetic domain, an electrical source providing electrical current through said magnetoresistive element when said domain is to be sensed, an expansion means distinct from said magnetoresistive element but contiguous thereto for expanding said domain prior to sensing by said magnetoresistive element, collapse means integral with said expansion means for collapsing said domain after being sensed by said magnetoresistive sensing element.

6. The device of claim 5, including means for reversing the polarity of said electrical current through said magnetoresistive element.

7. The device of claim 5, where said expansion means and said collapse means are comprised of magnetically soft elements.

8. The device of claim 7, further including means for providing a reorienting magnetic field in the plane of said magnetic medium for creating magnetic poles at various locations on said magnetically soft elements.

9. The device of claim 8, where said collapse means includes means for holding said domain while said magnetic field is reoriented in a plurality of directions.

* * * * *